United States Patent [19]

Koch et al.

[11] Patent Number: 4,557,648
[45] Date of Patent: Dec. 10, 1985

[54] LATCHING CARGO IN AIRCRAFT

[75] Inventors: Eckhard Koch, Lilienthal; Günter Vogg; Jochen Soller, both of Bremen, all of Fed. Rep. of Germany

[73] Assignee: Vereinigte Flugtechnische Werke GmbH, Bremen, Fed. Rep. of Germany

[21] Appl. No.: 467,344

[22] Filed: Feb. 17, 1983

[30] Foreign Application Priority Data

Feb. 22, 1982 [DE] Fed. Rep. of Germany ....... 3206384

[51] Int. Cl.⁴ ............................................. B64C 1/20
[52] U.S. Cl. ...................................... 410/78; 410/79; 410/92; 244/118.1
[58] Field of Search ............. 244/137 R, 118.1, 118.2, 244/118.6; 410/46, 52, 68, 69, 70, 75, 77, 78, 79, 80, 81, 84, 85, 86, 87, 92, 94, 95, 110, 115; 104/165; 414/498; 193/35 R, 35 C, 35 MD

[56] References Cited

U.S. PATENT DOCUMENTS

| 3,251,489 | 5/1966 | Davidson | 410/92 X |
| 3,381,921 | 5/1968 | McDonough et al. | 244/137 R |
| 3,899,092 | 8/1975 | Nordstrom | 244/137 R |
| 3,906,870 | 9/1975 | Alberti | 410/79 |
| 4,144,821 | 3/1979 | Lang | 410/79 |
| 4,273,053 | 6/1981 | Gibbs | 104/165 X |
| 4,372,219 | 2/1983 | Gibbs | 104/165 |
| 4,457,649 | 7/1984 | Vogg | 410/46 |

OTHER PUBLICATIONS

"Handling Design Concepts for Air-Freight with Extra-Large Aircraft", Fördern und Heben, 20, (1970), No. 14, pp. 817-820.

Primary Examiner—Robert B. Reeves
Assistant Examiner—Dennis C. Rodgers
Attorney, Agent, or Firm—Ralf H. Siegemund

[57] ABSTRACT

The floor in an aircraft having a cargo space is provided with a conveyor system comprised of roller type tracks and an array system of rails superimposed upon the conveyor system. Latch elements positionable in relation to and connectable to the rails in variable positions are provided for sliding on the rails and being fastened thereto in selective positions. The latch elements are constructed for engaging pieces of freight, such as containers and pallets, for latching them into positions as predetermined by the positions of the rail elements.

2 Claims, 3 Drawing Figures

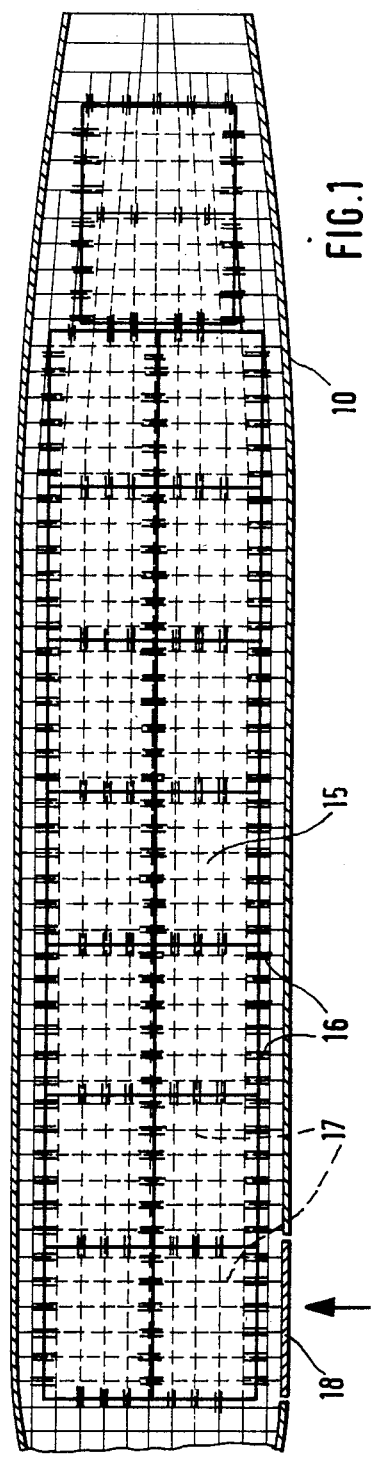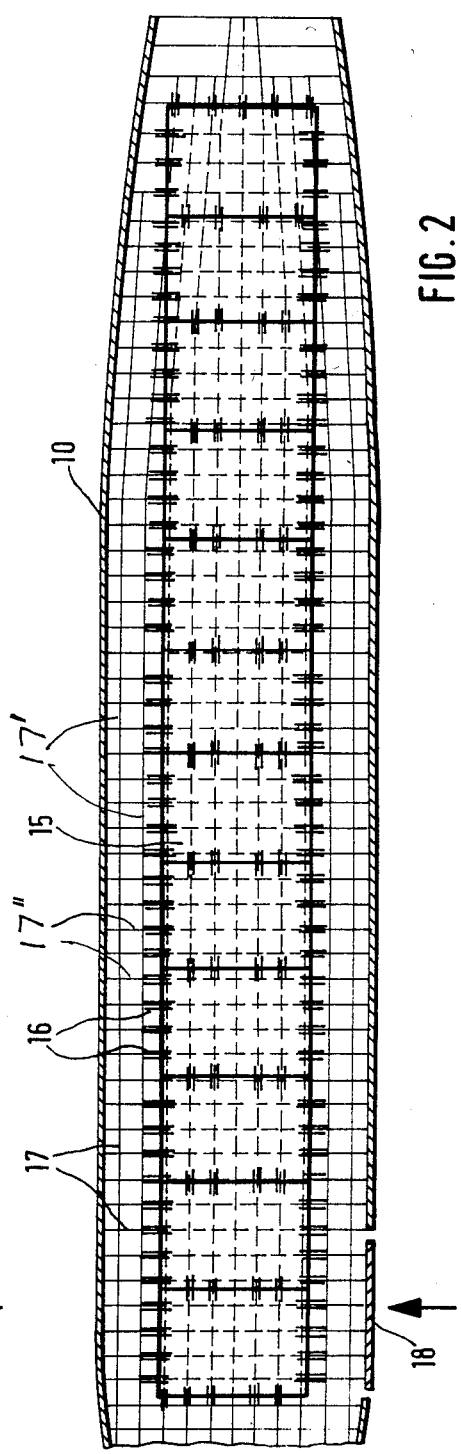

LATCHING CARGO IN AIRCRAFT

BACKGROUND OF THE INVENTION

The present invention relates to improvements in aircraft and particularly to improvements in the freight and cargo storage facilities of an aircraft generally being designed for holding containers and/or pallets. Moreover, the present invention relates to the construction of the storage space in aircraft being accessible through a freight hatch and having roller and ball-like tracks for moving containers and pallets about; moreover, latch elements are provided in such a storage place in order to positively position the objects, i.e. containers and/or pallets being stored in preassigned positions.

Aircraft today, and particularly commercial aircraft, are either operated in a mixed-passenger-cargo mode or exclusively as freight or cargo planes. In either case, freight-holding containers or pallets on which the freight is mounted, stored and fastened are moved into the aircraft during loading, or out of the aircraft during unloading, through a particular freight hatch. Ball mats and/or roller tracks are provided inside the aircraft for moving the rather heavy containers about and into particular positions. The rolling conveyor facilities serve also as storage locations and support after the various pieces of freight have been properly positioned. Therefore, latch elements are to be strategically provided in order to latch and arrest the pieces of freight into position or positions into which they have been moved. Latching is, of course, required and necessary because the rolling conveyor facility on which the pieces of freight rest would readily permit the pieces to move about in the storage area, because ease of movement (low friction) is the hallmark of such conveyor facilities. But, of course, once the aircraft is loaded, the various pieces of freight should stay put and their moving about has to be prevented until it is time to unload the aircraft.

Another aspect to be considered here is the fact that the containers and pallets are loaded to a widely varying degree. Moreover, they have different dimensions. So-called standard dimensions today are 88 inches by 125 inches or 88 inches by 108 inches. Due to these differences in dimensions, storing the freight efficiently in the storage area may become of logistics problem. A large system of distributed latches would be required for optimizing the area load distribution. This may pose a problem, the solution of which is highly uneconomical because of the great expenses realization would require.

DESCRIPTION OF THE INVENTION

It is an object of the present invention to provide a new and improved freight-loading and storing system for aircraft and here particularly for aircraft having a cargo area equipped with the ball mats and roller tracks, and further, being equipped with latch elements for arresting pieces of freight such as containers and pallets in predetermined positions.

It is a particular object of the present invention to provide a new and improved freight system for aircraft which optimizes the load distribution towards uniform area loading and utilization of the available space in a manner which is economically realizable.

In accordance with the preferred embodiments of the present invention, it is suggested to supplement the ball mat and roller-type conveyor system in the cargo space of an aircraft by means of a, so to speak, superimposed rail system, grid or matrix for latch elements which, on one hand, are permitted to slide in the rails of the system for purposes of adjusting their position but which, on the other hand, can be arrested in particular positions which in turn define the positions of arresting and holding the pieces of freight to be fastened. In other words, it is a principle of the invention to superimpose upon the conveyor system on the floor of a cargo space in an aircraft, a rail system for variably positioning load-fastening elements.

The invention permits the adaptation of the cargo space in an aircraft to different distribution and different quantities of cargo with very little expenditure and time and no additional equipment requirements. The latch elements are in each instance arrested in position to accommodate two juxtaposed rows of containers or to accommodate just one of them leaving a certain vacant space next to that particular row for purposes of optimizing the overall load distribution. The grid and array system of rails is relatively dense to accommodate differently wide pieces of cargo. The latch elements can be put into any desired position within the two-dimensional array which extends preferably in the direction of the longitudinal axis of the craft and transversely thereto.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings in which:

FIG. 1 illustrates somewhat schematically a floor plan for a cargo space in an aircraft using two rows for container storage;

FIG. 2 is analogously a floor plan of an aircraft with a single storage row.

Proceeding now to the detailed description of the drawings, the figures show the fuselage 10 of an aircraft presumed to be a freight or cargo plane. FIG. 1 particularly shows a freight storage and cargo loading system wherein two longitudinally parallel container rows are to be provided for. FIG. 2 differs from FIG. 1 only in regard to the number of rows in the cargo space, there being only a single container row provided for.

Figure 3:
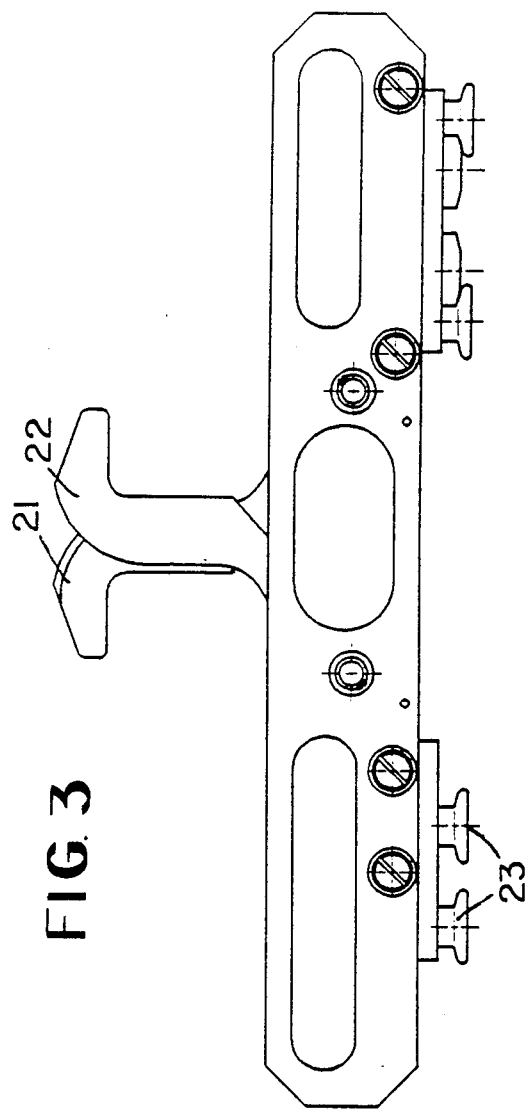
FIG. 3 is a side view of a latch element that can be used in the system shown in FIGS. 1 and 2.

The container 15, illustrated schematically as squares, is held in position within the cargo space by means of latch elements 16. The latch elements 16 are placed and are positioned in rails of a rail system 17. The system 17 is comprised of longitudinal rails 17', as well as of transverse rails 17" which are arranged within the same plane which holds roller and ball conveyor elements by means of which the containers are moved about within the cargo space.

The rail system permits the latch elements 16 to be placed in any position within the array of rails. The rails particularly are constructed to permit positive positioning of the latch elements 16. In other words, the latching function of the rail of the elements 16 is to be understood in a two-fold manner. These elements are on one hand latchable to and within the rail system while, on the other hand, they latch pieces of cargo such as containers into a position defined by the latching position of the elements as far as the rail system and array is concerned.

Latch elements to be used within the inventive system are, for example, disclosed in U.S. patent application Ser. No. 339,129, filed Jan. 13, 1982; now U.S. Pat. No. 4,457,649.

These latch elements are disposed in between two rails of the rail system; they are used primarily along pallets or container rims with no adjacent cargo FIG. 3 shows a latch element which has latching members 21 and 22 engaging juxtaposed rims of adjacent cargo pieces or rows. The feet 23 are insertable in rails, constructed as shown in the above mentioned applicaton.

From the foregoing it can be seen that the arrangements as depicted in FIG. 1 and FIG. 2 differ without structural differences, but only by operation of the positioning of the latch elements. In other words, the freight space and cargo area of an aircraft can be adapted to receive two parallel rows of containers and pallets or just a single row. Depending upon the weight and/or volume of the containers, one may alternate between one and two containers in longitudinal direction in order to obtain an optimum in cargo space utilization under observance of uniform area load and for a given type of system of containers and pieces of freight.

The pieces of freight are either containers or pallets and are moved in and out of the cargo space through a cargo hatch 18 and they are moved within the cargo space by means of roller and ball-type conveyors, as mentioned above. The latch elements 16 may double up as guide elements as far as the moving of the several pieces of the cargo space is concerned. The inventive system is, of course, usable in a freight plane as well as in a mixed-mode plane having an upper floor for passengers and a lower cargo space.

The invention is not limited to the embodiments described above; but all changes and modifications thereof, not constituting departures from the spirit and scope of the invention, are intended to be included.

We claim:

1. In an aircraft having a cargo space the floor of which is provided with roller or roller type track means constituting a conveyer system, the improvement comprising:
    an array system of rails superimposed upon said conveyer system and being comprised of first rails extending longitudinally to the aircraft, and of second rails extending transverse to the first rails and in the same plane; and
    a plurality of latch elements positionable in relation to and connectable to the first and second rails of said rail system and in variable positions thereto, the latch elements provided for sliding on the rails and being fastened thereto in selective positions, the latch elements constructed for engaging pieces of freight such as containers and pallets, for latching them into positions as predetermined by the positions of the rail elements.

2. A system as in claim 1, the latch elements being constructed to serve as guide elements.